(12) United States Patent
Anderson et al.

(10) Patent No.: US 7,143,408 B2
(45) Date of Patent: Nov. 28, 2006

(54) SOFTWARE INSTALLATION FOR HARDWARE DEVICES

(75) Inventors: Jeff M. Anderson, Camas, WA (US); Donald J Welch, Vancouver, WA (US); Mark H. Schmidt, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 708 days.

(21) Appl. No.: 09/940,360

(22) Filed: Aug. 27, 2001

(65) Prior Publication Data

US 2003/0041324 A1    Feb. 27, 2003

(51) Int. Cl.
*G06F 9/445* (2006.01)
(52) U.S. Cl. ...................................................... 717/175
(58) Field of Classification Search ............... 717/102, 717/103, 120, 168–178; 709/310, 321; 234/492; 702/122, 123
See application file for complete search history.

(56) References Cited

U.S. PATENT DOCUMENTS

| 6,543,047 B1 * | 4/2003 | Vrhel, et al. ................ 717/121 |
| 2002/0099864 A1 * | 7/2002 | Henkemeyer ............... 709/310 |

OTHER PUBLICATIONS

Fida International, "Prolink Hurricane 8000 ADSL Modem", User's Manual, Ver. 1.5, 2000, pp. P1-P26.*
Polycom, ViaVideo User's Guide, ViaVideo QuickStart, Nov. 2000.*
Jeffrey Richter, "Microsoft Systems Journal: Q&A Win 32", Sep. 1998, pp. 1-5 url:<http://www.microsoft.com/msj/0998/win320998.aspx>.*
Hewlett-Packard Company U.S. Appl. No. 09/943,875, filed Aug. 31, 2001; "System And Method For Providing Hardware Driver Installation."
Hewlett-Packard Company U.S. Appl. No. 09/943,879, filed Aug. 31, 2001; "System And Method For Installing Window Installer Service Without Rebooting."

* cited by examiner

Primary Examiner—Kakali Chaki
Assistant Examiner—Tuan A. Vu (57) ABSTRACT

Software installation for hardware devices is disclosed. Software for a device to be connected to a computer is installed on the computer. While the software is being installed, an automatic installation mode for the device may be suppressed. This mode is suppressed after being automatically initiated by the operating system of the computer upon the device being connected to the computer before the software is completely installed. Furthermore, once the software has been installed, the user may be instructed to connect the device to the computer, after which the automatic installation mode for the device may be initiated without rebooting the computer.

11 Claims, 9 Drawing Sheets

PRIOR ART

FIG 1

PRIOR ART

FIG 2

PRIOR ART

SOFTWARE INSTALLATION FOR HARDWARE DEVICES

FIELD OF THE INVENTION

This invention relates generally to hardware devices for computers, such as printers, scanners, digital cameras, multi-function devices, and other devices, and more particularly to the installation of software for such devices.

BACKGROUND OF THE INVENTION

Computer users today can choose from a wide variety of different peripherals to connect to their computers. Printers, such as inkjet and laser printers, allow users to print hard copies of their documents, images, and files. Digital cameras allow users to take digital pictures, which can then be imported into their computers for subsequent modification, sharing, and printing. Scanners allow users to scan in printed documents into their computers as digital images, for dissemination to others, for storage, and for conversion to word processing files. Multi-function devices allow users to print, scan, fax, and/or and perform other functions.

Many operating systems have built-in mechanisms that allow for easier installation of hardware devices than in the past. For instance, an operating system may automatically detect a new device connected to a computer, and offer the user automatic installation of software for the device in what is referred to herein as an automatic installation mode. The WINDOWS family of operating systems, for instance, which is available from Microsoft Corp., of Redmond, Wash., supports such a mode, which is referred to as Plug and Play. The user plugs in a device into a hardware port, such as a Universal Serial Bus (USB) port, of the computer. The operating system immediately detects the new device, and offers to install software for the device.

Unfortunately, the automatic installation mode found in such operating systems frequently conflicts with the instructions provided by hardware device manufacturers for installing software for their devices. An operating system typically only includes the minimum amount of special software, called drivers, for such devices, and even then typically only for common hardware that was available when the operating system was initially released. Drivers are the low-level software that enable computer programs running on the computer to communicate with hardware devices, typically through the operating system of the computer.

However, because hardware manufacturers are constantly releasing new and improved devices, they usually provide updated drivers with their hardware for users to install prior to connecting the hardware to a computer. These drivers may not be available to the operating system unless they are initially copied to the computer as recommended by the manufacturers. Furthermore, drivers for less common and obscure devices may not be included with the operating system even if they were available when the operating system was released. Therefore, the hardware manufacturers in such cases must provide the drivers.

In addition, the hardware manufacturers may include other software for their devices that complement the drivers and allow for easier and more optimal use of the hardware. Such complementary software is above and beyond the low-level software that is the bare minimum the operating system needs to allow computer programs to use the hardware. The manufacturers may also include software to enable online registration for the user's newly purchased hardware, as well as to provide other functionality. The hardware manufacturers thus may instruct the users to install their software first, before the automatic installation mode is initiated to finalize the installation.

Figure 1:
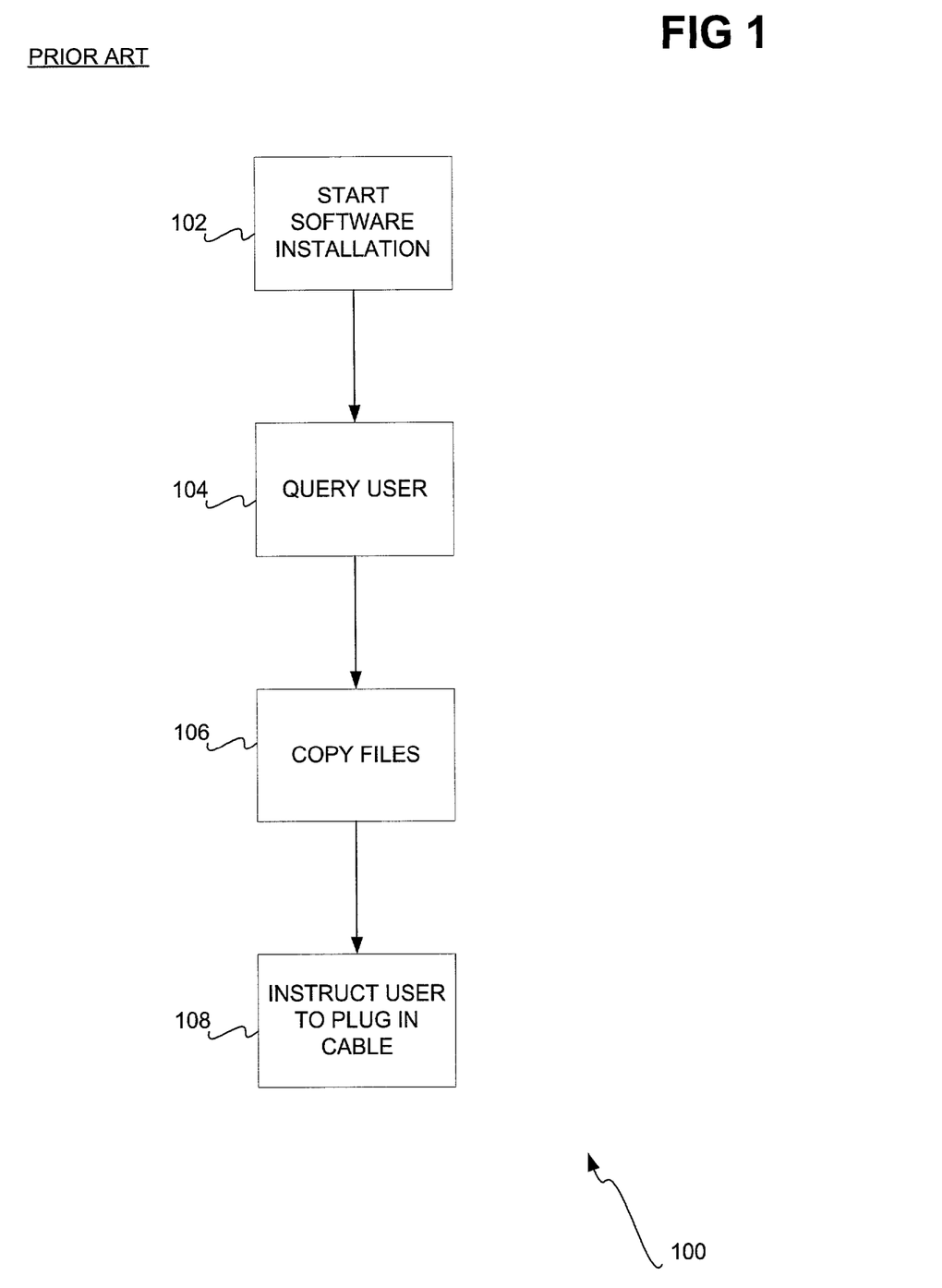
FIG. 1 is a flowchart of a method for installing software for a hardware device according to a software-first installation process of the prior art.

FIG. 1 shows a method 100 outlining the general process of software installation for a hardware device as may be followed and recommended by a hardware manufacturer. The method 100 is referred to as a software-first installation in that software for the device is installed on the computer before the device is connected to the computer. First, the user starts the installation of the software by running an installer program (102). The installer program may query the user as to what parts of the software available for installation the user wishes to install (104). The program copies the necessary and appropriate files to the computer (106), and then instructs the user to connect the hardware to the computer to complete the installation (108).

Figure 2:
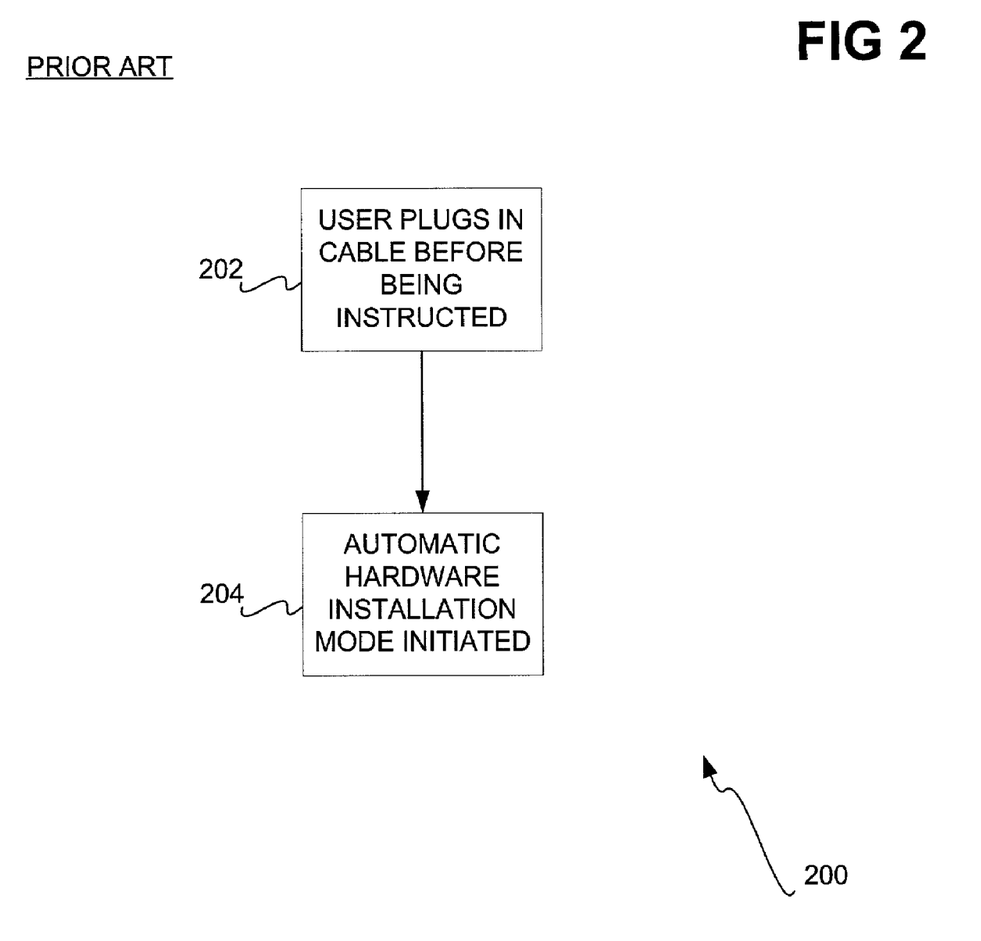
FIG. 2 is a flowchart of a method for installing software for a hardware device according to a hardware-first installation process of the prior art.

However, users are many times impatient, plugging the cable for the hardware into a corresponding connector of the computer before installation of the software has been completed. Alternatively, the user may simply be following the operating system's recommendation or suggestion of being able to connect the hardware to the computer before installing any software for the hardware. FIG. 2 shows a method 200 outlining what occurs when the user connects the hardware before the software installation of FIG. 1 has been completed. The user connects the device to the computer before being instructed to do so by the installer program (202). In response, the operating system, assuming it can immediately detect the new hardware, initiates its automatic hardware installation mode (204).

As has been indicated, the automatic hardware installation mode of the operating system may contradict the software-first installation recommended by the manufacturer of the device. The automatic hardware installation mode, also referred to as a hardware-first installation, in that the hardware is connected to the computer before the software for the hardware is installed, may present conflicting instructions to the user as compared to the software-first installation. Inexperienced and novice users may become confused, not knowing whether to follow the instructions of the software-first installation, or those of the hardware-first installation.

Figure 3:
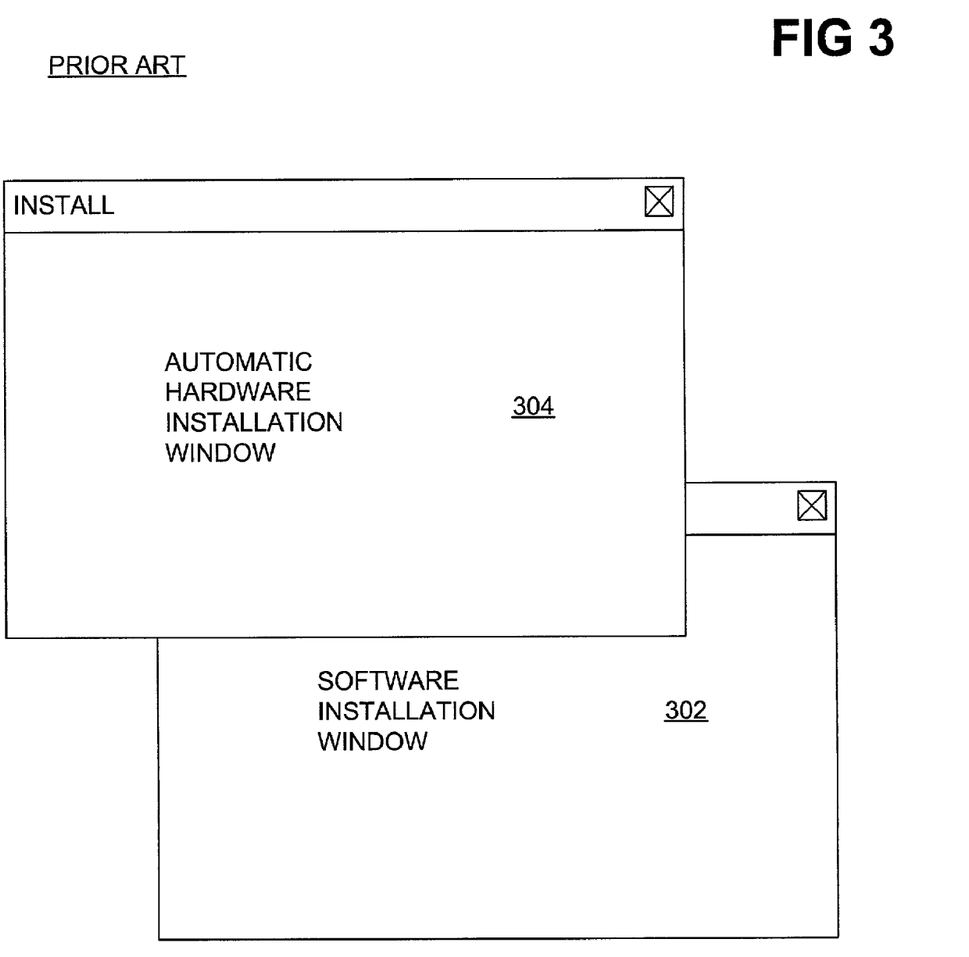
FIG. 3 is a diagram showing a window according to the hardware-first installation process of FIG. 2 conflicting with a window according to the software-first installation process of FIG. 1.

This scenario is depicted in FIG. 3, in which a software installation window 302 is first shown to the user in which instructions are provided by the manufacturer of the device as to installation of software for the device, such as drivers, complementary computer programs, and so on. However, if the user connects the device to the computer prior to completion of the software-first installation, a second window 304 appears. The window 304 is an automatic hardware installation window, and may overlap the software installation window 302. The instructions provided in the window 304 are given by the operating system as part of a hardware-first installation, and may contradict the instructions provided by the device manufacturer in the window 302 as part of a software-first installation.

The difficulties with installation of software for hardware devices that have been described generally occur with devices that can be immediately detected by the operating system when they are connected to the computer. Such devices usually plug into a USB port, an IEEE 1394 port, which is also referred to as a FireWire port or an i-Link port, or another port of the computer that is hot. A hot port is one into which a cable for a device can be plugged while the computer is on, desirably for immediate detection by the operating system. For some operating systems, the parallel port, which is also referred to as the IEEE 1284 port, is also a hot port.

Other devices, however, cannot be immediately detected by the operating system when they are connected to the computer. Such devices usually plug into a serial port, or another port of the computer that is cold, meaning that a cable for a device should be plugged into the port while the computer is off. For some operating systems, the parallel port is also a cold port. The operating system usually can only detect such devices when first booting up. That is, connecting a device to such a port of the computer does not usually result in the operating system immediately detecting the device without prompting.

A difficulty with software installation for this latter type of hardware device is that the computer may have to be rebooted before the operating system becomes aware of the new hardware. For instance, whereas devices connected to the computer via USB and other hot ports generally do not require rebooting, devices connected to parallel and other cold ports generally require rebooting. The user typically installs software for the new device, and then is instructed to connect the device to the computer and reboot the computer to finish the installation process. Alternatively, after installing the software, the user may be instructed to turn off the computer, connect the device to the computer, and then turn back on the computer.

However, rebooting is at best an inconvenient process for the user. Even modern operating systems can take upwards of five minutes or more to reboot. The exact amount of time depends on the type and speed of the computer, the number of peripherals installed on the computer, the amount of software that is always loaded at startup, as well as other factors.

Therefore, both for devices that can be immediately detected by the operating system when connected to the computer, and for devices that cannot be immediately detected by the operating system when connected to the computer, there are disadvantages to current processes for installing software for such devices. That is, both for devices that have cables that connect to hot ports of the computer and for devices that have cables that connect to cold ports of the computer, there are disadvantages to current software installation routines for such devices. For these and other reasons, there is a need for the present invention.

SUMMARY OF THE INVENTION

The invention relates to software installation for hardware devices, such as printers, scanners, digital cameras, multi-function devices, and other devices. Software for such a device to be connected to a computer is installed on the computer. While the software is being installed, an automatic installation mode for the device may be suppressed. This mode is suppressed after being automatically initiated by the operating system of the computer upon the device being connected to the computer before the software is completely installed. Once the software has been installed, the user may be instructed to connect the device to the computer, after which the automatic installation mode for the device is initiated without rebooting the computer. Still other embodiments and aspects of the invention will become apparent by reading the detailed description that follows, and by referring to the drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Software Installation for Hardware with Automatic Detection-Type Cable

Figure 4:
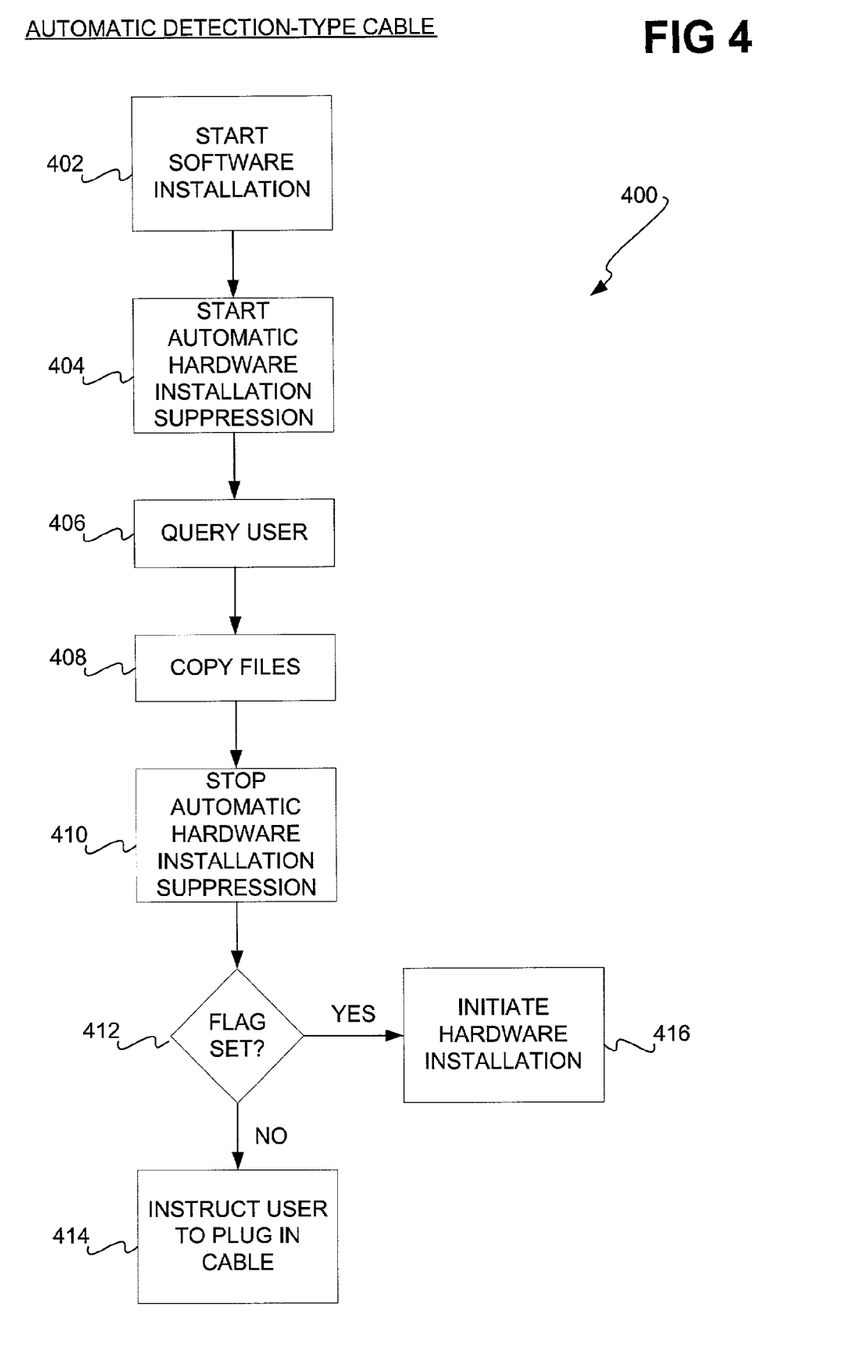
FIG. 4 is a flowchart of a method for installing software for a hardware device that can be immediately detected by an operating system of a computer, in which the automatic hardware installation by the operating system is suppressed, according to an embodiment of the invention.

FIG. 4 shows a method 400 for software installation for hardware with an automatic detection-type cable, according to an embodiment of the invention. The hardware may be a printer, a scanner, a digital camera, a multi-function device, or another type of hardware device. The hardware preferably has a cable that plugs into a hot port of a computer, such that an operating system of the computer is able to automatically and immediately detect connection of the device to the computer. The method 400 may be performed by execution of computer instructions by a processor of the computer from a computer-readable medium of the computer, such as a memory, a hard disk drive, a CD-ROM, a floppy disk, and so on.

The software installation is first started (402). This may be because the user manually initiates the installation, such as by clicking on an icon representing an installer program. Alternatively, the user may automatically initiate the installation, by inserting a removable computer-readable medium, such as a CD-ROM or a floppy disk, into a corresponding drive of the computer. Insertion of the medium is such that an auto-run feature causes the installer program to automatically run. The user is also preferably instructed not to connect the device for which software is being installed to the computer until being instructed to do so.

Automatic hardware installation by the operating system of the computer is suppressed (404). The automatic hardware installation is also referred to as the automatic installation mode for the device. Such automatic installation results when the user connects the device to the computer prior to the software installation of the method 400 being completed, against previous instructions not to do so. The installation of the method 400 is a software-first installation, whereas the automatic install mode is a hardware-first installation. By suppressing the hardware-first installation, the method 400 ensures that conflicting instructions from the hardware-first installation, as compared to the software-first installation of the method 400, are not presented to the user. If the user does prematurely connect the hardware to the computer, the hardware-first installation is suppressed, or aborted, and a flag is set indicating that the user has connected the hardware to the computer.

The user is queried as to what aspects of the software for the device should be installed (406). For example, the software for the device may include the device drivers necessary for the device to be used by computer programs running on the computer, complementary software that although not necessary for the device to be used enhances usage thereof, as well as other software. Typically, the querying gives the user three or more options: an option for a typical software installation, an option for a minimum software installation, and an option for a custom software installation. Files corresponding to the user's selections are then copied to the computer, or otherwise installed on the computer (408), and the automatic hardware installation mode is no longer suppressed (410).

If the user had previously connected the hardware to the computer, resulting in suppression of the hardware-first installation and setting of the flag, against instructions not to do so (412), then the hardware-first installation is initiated again (416). The automatic installation mode is re-initiated now because the appropriate files for the installation of the software for the device have been copied to the computer, so that initiating the automatic installation mode now finishes the software installation for the device. The automatic installation mode performed by the operating system will again detect connection of the device to the computer, and install the files that have been copied to the computer for proper usage of the device by computer programs running on the computer. As a result of the earlier copied files, the hardware-first installation will be properly accomplished. If the hardware-first installation had been allowed to continue before these files were copied to the computer, then outdated or incorrect software for the device may have been installed by the operating system.

If the user had not previously connected the hardware to the computer, such that the flag was not set (412), then the user is now instructed to plug in the cable for the device to the computer (414). When the user connects the device to the computer, the automatic installation mode for the device is initiated by the operating system of the computer. This completes installation of the software for the device. As has been indicated, initiation of the automatic installation mode for the device is appropriate now because the correct files have been copied to the computer by the software-first installation. If the automatic installation mode had been initiated and performed prior to these files having been copied to the computer, outdated or incorrect files may have been improperly installed for the device. The user may also have encountered conflicting or inconsistent instructions by the hardware-first installation, as compared to those provided by the software-first installation.

Figure 5:
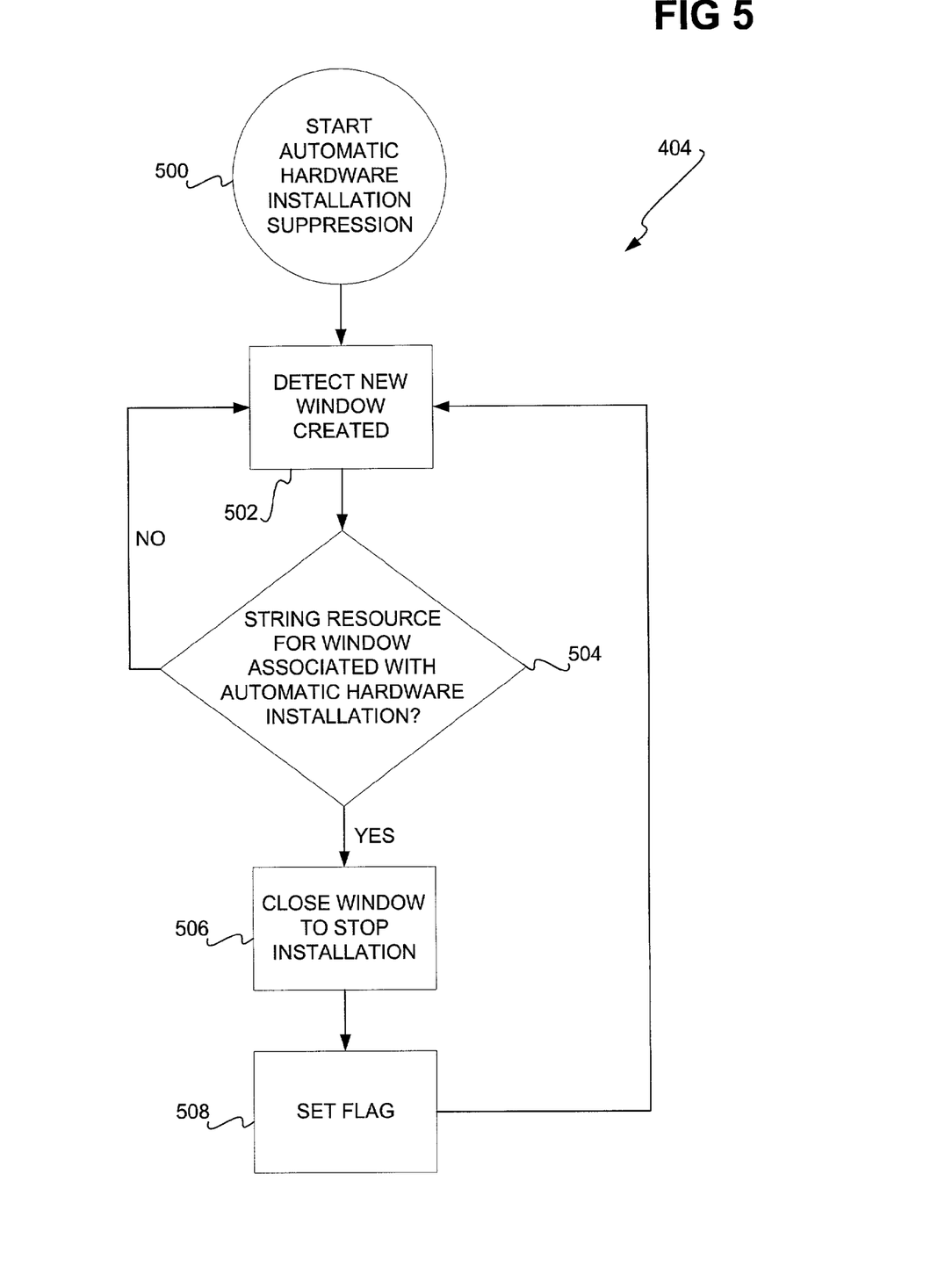
FIG. 5 is a flowchart of a method showing the manner by which suppression of the automatic hardware installation of FIG. 4 can be accomplished, according to an embodiment of the invention.

FIG. 5 shows how one embodiment of the invention achieves the automatic hardware installation suppression of 404 of FIG. 4. Other approaches may also be performed to accomplish the automatic installation mode suppression of 404 of FIG. 4, however. Once the automatic hardware installation suppression starts (500), any new window that is created is detected (502). When a new device is connected to the computer, the operating system initiates the automatic installation mode, causing a window corresponding to the mode to be created to provide the user with instructions for the hardware-first installation. Therefore, detection of this window allows for the automatic installation mode for the device to be suppressed by closing the window.

For each new window created, an attribute for the window is compared to a known attribute associated with the automatic installation mode (504). More specifically, this attribute can be a string resource of the window that is compared with a known string resource associated with the automatic installation mode. For the WINDOWS 98 operating system, this is the string resource 1777 from the file sysdm.cpl. For the WINDOWS 2000 operating system, this is the string resource 2040 from the file newdev.dll.

If the newly created window has the attribute associated with the automatic hardware installation (504), then the window is closed (506). Closing the window effectively exits the automatic installation mode for the new device. That is, closing the window suppresses the automatic installation mode for the new device, by exiting the hardware-first installation mode for the device. The window is created, detected, and closed preferably faster than the user can perceive the window on the display, such that preferably the user at most sees on the display a quick flash of the window being created and then closed. The flag indicating that the user has connected the hardware to the computer is then set (508), and any other new windows are again detected (502), repeating the process that has been described.

However, if the newly created window does not have the attribute associated with the automatic hardware installation (504), then other new windows are detected (502) without closing the window most recently created. This is because the window most recently created does not correspond to the automatic installation mode, meaning that the user has not connected the device to the computer. Because the operating system may be a multitasking operating system, other windows may be created while the software-first installation of FIG. 4 occurs, and not just windows associated with the automatic installation mode. Therefore, it is preferable to only close those windows associated with the hardware-first installation mode, and not all windows created while the installation of FIG. 4 occurs.

Figure 6:
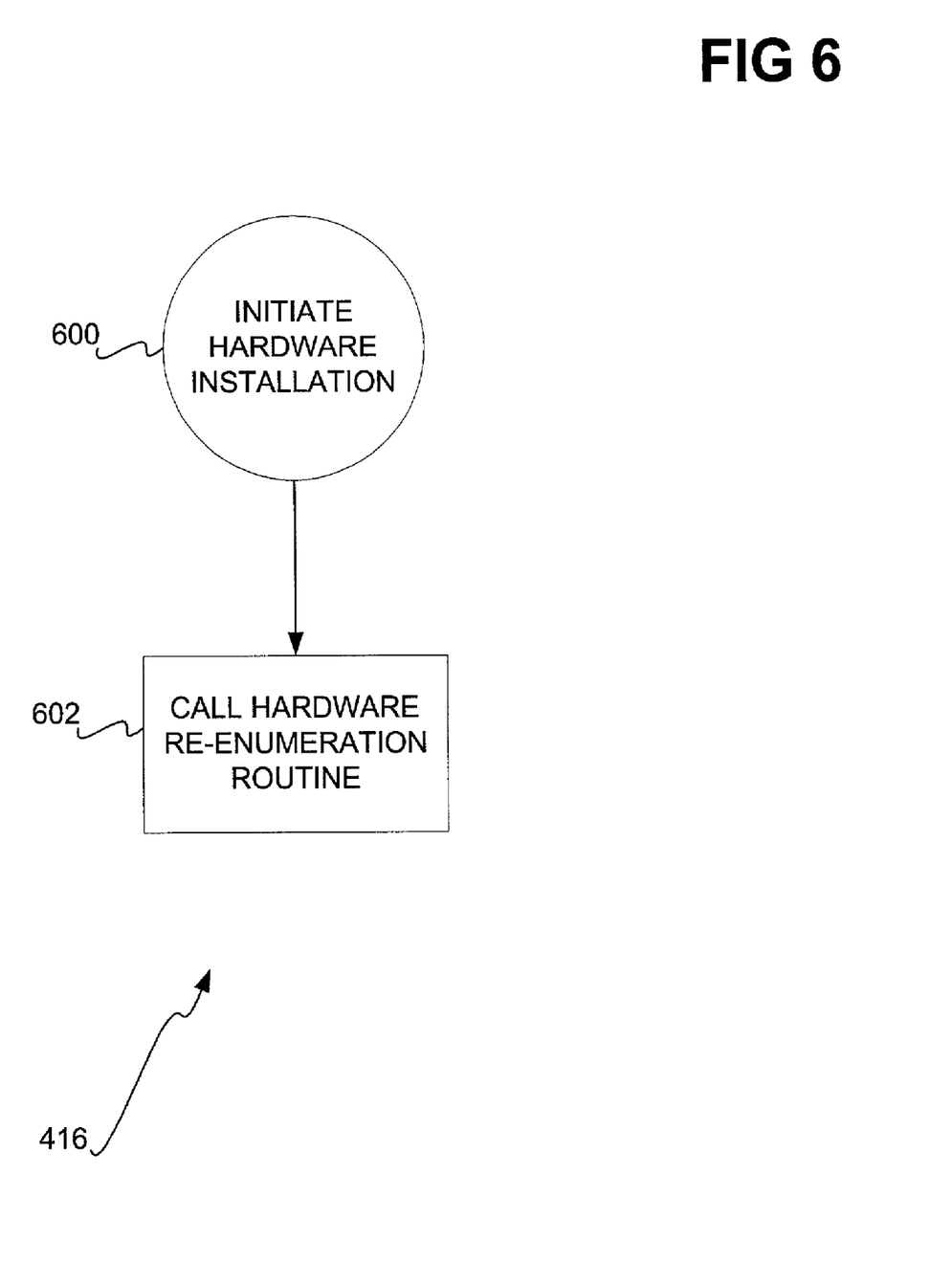
FIG. 6 is a flowchart of a method showing the manner by which the automatic hardware installation by an operating system can be accomplished for finishing the software installation of FIG. 4, according to an embodiment of the invention.

FIG. 6 shows how one embodiment of the invention achieves initiation of the automatic hardware installation of 416 of FIG. 4. Other approaches may also be performed to accomplish the initiation of the automatic installation mode of 416 of FIG. 4, however. The automatic installation mode initiated in 416 of FIG. 4 is preferably the same mode that was previously suppressed in 404 of FIG. 4. Whereas the mode was previously suppressed to ensure that the hardware-first installation does not occur concurrently with the software-first installation, once the appropriate files have been copied by the software-first installation, the automatic hardware installation is properly invoked.

Once the automatic hardware installation is initiated (600), a hardware re-enumeration routine of the operating system is called (602). In the context of versions of the WINDOWS operating system, this routine is the CM_Reenumerate_DevNode function of the operating system. Calling this routine initiates the automatic installation mode, such that connection of the device to the computer is detected, and software installation for the device is completed so that computer programs running on the computer can use the device.

Figure 7:
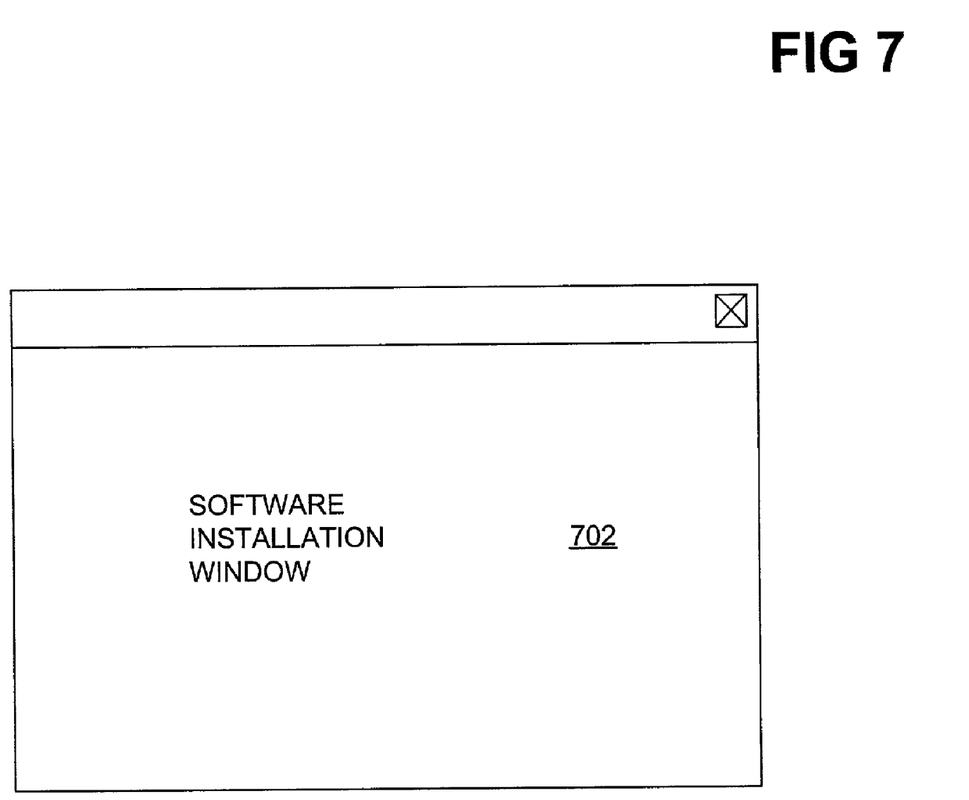
FIG. 7 is a diagram showing a window according to the software installation process of FIG. 4, according to an embodiment of the invention.

FIG. 7 depicts the scenario of the software-first installation of FIGS. 4–6 that has been described. Significantly, only a software installation window 702 is shown to the user, in which instructions are provided in accordance with the method 400 of FIG. 4. That is, no automatic hardware installation is shown to the user, in contrast to the prior art, because the automatic installation mode is suppressed by the method 400 of FIG. 4. If the user prematurely plugs the cable for the hardware into a corresponding port of the computer, the new window created by the automatic installation mode initiated by the operating system is detected and quickly closed.

Software Installation for Hardware with Manual Detection-Type Cable

Figure 8:
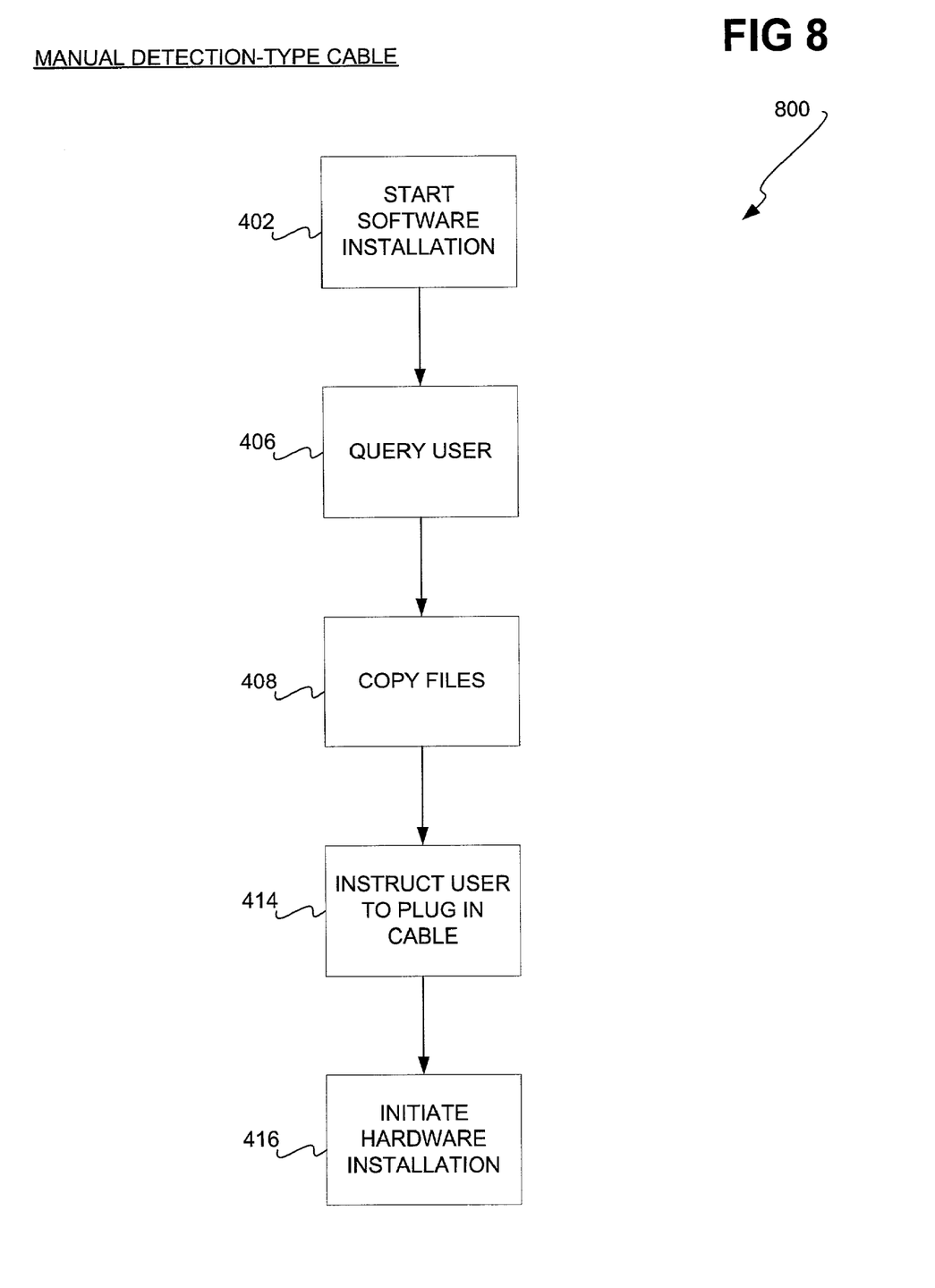
FIG. 8 is a flowchart of a method for installing software for a hardware device that cannot be immediately detected by an operating system of a computer, in which rebooting of the computer is not required, according to an embodiment of the invention.

FIG. 8 shows a method 800 for software installation for hardware with a manual detection-type cable, according to an embodiment of the invention, although the method 800 may be more generally used for software installation for hardware with any type of cable. The hardware may be a printer, a scanner, a digital camera, a multi-function device, or another type of hardware. The hardware preferably has a cable that plugs into a cold port of a computer, such that an operating system of the computer is not able to automatically and immediately detect connection of the device to the computer. Rather, the operating system must either be specifically instructed to detect connection of the hardware of the computer, or instructed that the hardware has been connected to the computer. The method 800 may be performed by execution of computer instructions by a processor of the computer from a computer-readable medium of the computer, such as a memory, a hard disk drive, a CD-ROM, a floppy disk, and so on.

The software installation is first started (402). This may be because the user manually initiates the installation, such as by clicking on an icon representing an installer program. Alternatively, the user may automatically initiate the installation, by inserting a removable computer-readable medium, such as a CD-ROM or a floppy disk, into a corresponding drive of the computer. Insertion of the medium is such that an auto-run feature causes the installer program to automatically run.

Unlike the method 400 of FIG. 4, preferably the method 800 does not need suppression of the automatic installation mode, because the mode cannot be automatically initiated by the operating system if the user prematurely connects the device to the computer. This is because the method 800 is preferably performed for hardware with a manual detection-type cable, insertion of which into a corresponding port of the computer is not immediately detected by the operating system. Therefore, the user is next queried as to what aspects of the software for the device should be installed (406), as in the method 400. Files corresponding to the user's selections are then copied to the computer, or otherwise installed on the computer (408), also as in the method 400.

The user is instructed to plug in the cable for the device to the computer (414). Preferably, the user is also asked to confirm that he or she has connected the device to the computer, by, for instance, clicking on an appropriate button in a window displayed to the user. When the user connects the device to the computer, the automatic installation mode for the device is not initiated by the operating system. Therefore, the hardware-first installation is instead initiated by the method 800 itself (416) to complete installation of the software. This causes the operating system to scan the ports of the computer for newly connected hardware, such as the device just connected by the user to the computer. Initiation of this automatic hardware installation can be accomplished as has been described in conjunction with FIG. 6.

The method 800 contrasts with the prior art in that it does not require rebooting of the computer to initiate the automatic installation mode to complete installation of the software for the device. That is, the prior art generally requires that the user reboot the computer, or turn the computer off and then on, so that the newly connected device can be detected by the operating system to finish installing software for the device. By comparison, the method 800 initiates the automatic installation mode without requiring that the user reboot the computer, or otherwise turn the computer off and then back on.

Point-of-Sale Device Package

Figure 9:
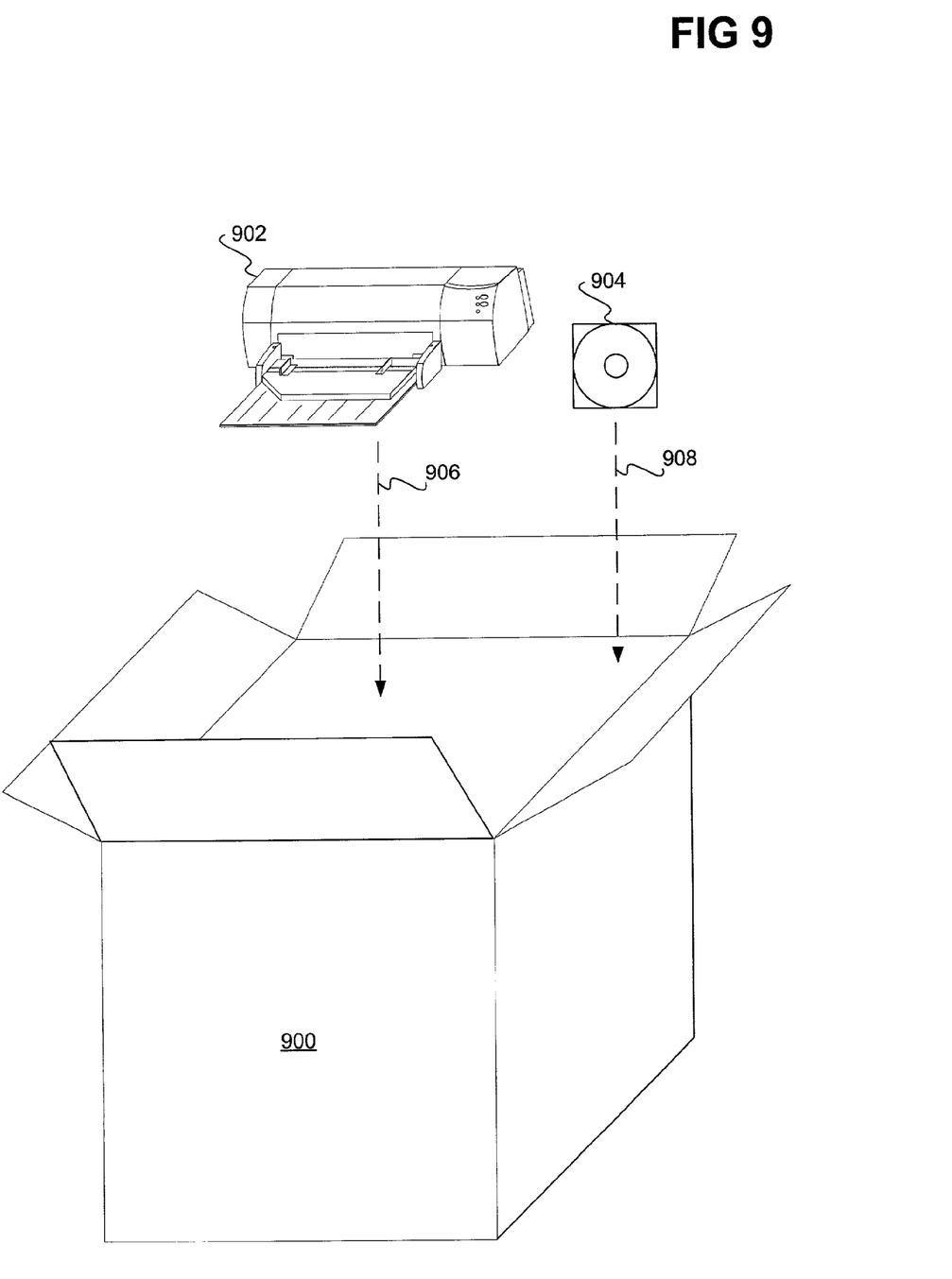
FIG. 9 is a diagram of a point-of-sale package including a device and a computer-readable medium having instructions stored thereon for performing a method to install software for the device on a computer to which the device is to be connected, according to an embodiment of the invention.

FIG. 9 shows a point-of-sale package 900 according to an embodiment of the invention. The package 900 may be sold or provided to the user at a retail store, delivered to the user through the mail or other delivery service, and so on. The package 900 may be a box or other type of container, which includes a hardware device 902, and a computer-readable medium 904, as indicated by the dotted arrows 906 and 908, respectively. The hardware device 902, as shown in FIG. 9, may be a printer, or it may be another type of device. The computer-readable medium 904, as shown in FIG. 9, may be a CD-ROM, or it may be another type of medium. The package 900 may include other objects besides the device 902 and the medium 904, such as manuals, packaging materials, and so on.

The device 902 is to be connected to a computer. The device may have an automatic detection-type cable for insertion into a corresponding hot port of the computer. The device may alternatively have a manual detection-type cable for insertion into a corresponding cold port of the computer. In the former case, connecting the device to the computer causes immediate detection thereof by the operating system of the computer. In the latter case, connecting the device to the computer does not cause immediate detection thereof by the operating system of the computer.

The medium 904 has computer instructions stored thereon to install software on the computer for the device. The computer instructions may be to install software on the computer, while suppressing the automatic installation mode for the device, as initiated by an operating system of the computer when the device is connected to the computer before the software installation is completed. That is, the instructions may be to perform the method 400 of FIG. 4 that has been described. Alternatively, the instructions may be to install software on the computer, and to initiate the automatic installation mode of the operating system after the software has been installed, without rebooting the computer. That is, the instructions may be to perform the method 800 of FIG. 8 that has been described.

CONCLUSION

Embodiments of the invention provide for advantages not found within the prior art. In the case of automatically detected hardware, embodiments of the invention ensure that conflicting instructions for software installation for the hardware are not given to the user. After the user starts the software-first installation, the hardware-first installation for the device is suppressed. Even if the user connects the device to the computer, the automatic installation mode initiated by the operating system is suppressed. Thus, conflicting instructions by the hardware-first installation, as compared to those of the software-first installation, are not shown to the user.

In the case of non-automatically detected hardware, embodiments of the invention allow for installation of software for such hardware without rebooting the computer, or otherwise turning the computer on and off. Once the user has connected the device to the computer, the automatic installation mode is initiated to complete the software installation. The computer thus does not have to be rebooted for the operating system to recognize the newly connected device, and for the installation of software for the device to be completed.

It is noted that, although specific embodiments have been illustrated and described herein, it will be appreciated by those of ordinary skill in the art that any arrangement is calculated to achieve the same purpose may be substituted for the specific embodiments shown. For example, other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:

1. A method for installing software for a device to be connected to a computer, the method implemented as computer instructions executed by a processor of the computer having an operating system running thereon, the software for the device and the computer instructions stored on a computer-readable medium communicatively coupled to the device, the method comprising:

the computer instructions installing the software on the computer for the device to be connected to the computer, in accordance with a software-first installation mode;

in response to the operating system detecting that the device has been connected to the computer, the operating system initiating an automatic installation/hardware-first installation mode for the device; the operating system displaying a window within a graphical user interface, the window related to the automatic installation/hardware-first installation mode and having an attribute and/or a string resource;

the computer instructions detecting the window related to the automatic installation/hardware-first installation mode, by one or more of:

the computer instructions comparing the attribute of the window to an attribute previously known to the computer instructions; and/or the computer instructions examining the string resource associated with the window to a string resource previously known to the computer instructions;

in response to the computer instructions detecting the window, the computer instructions causing the operating system to close the window within the graphical user interface, such that the automatic installation/hardware-first installation mode for the device is suppressed;

the computer instructions setting a flag;

the computer instructions completing installation of the software in accordance with the software-first installation mode;

wherein if the flag has been set, the computer instructions re-initiating the automatic installation/hardware-first installation mode for the device; and, wherein if the flag has not been set, the computer instructions instructing a user to connect the device to the computer, to cause the operating system to initiate the automatic installation/hardware-first installation mode for the device.

2. The method of claim 1, wherein installing the software on the computer comprises the user manually initiating installation of the software.

3. The method of claim 1, wherein installing the software on the computer comprises a user inserting a removable computer-readable medium into the computer, insertion of the media causing installation of the software.

4. The method of claim 1, wherein suppressing the automatic installation mode comprises:

detecting a new window;

determining whether the new window relates to the automatic installation mode; and, upon determining that the new window relates to the automatic installation mode, closing the window.

5. The method of claim 1, wherein initiating the automatic installation mode for the device comprises calling a hardware re-enumeration routine of the operating system of the computer.

6. The method of claim 1, further comprising instructing the user to connect the device to the computer, and waiting for the user to confirm that the device is connected to the computer.

7. A computer-readable medium having instructions stored thereon for execution by a processor of a computer having an operating system running thereon to perform a method for installing software for a device to be connected to a computer, the software also stored on the computer-readable medium, the method comprising:

the instructions installing software on the computer for device to be connected to the computer, in accordance with a software-first installation mode; in response to the operating system detecting that the device has been connected to the computer, the operating system initiating an automatic installation/hardware-first installation mode for the device; the operating system displaying a window within a graphical user interface, the window related to the automatic installation/hardware-first installation mode and having an attribute and/or a string resource;

the instructions executed by the processor of the computer detecting the window being displayed within the graphical user interface;

the instructions determining that the window relates to the automatic installation/hardware-first installation mode for the device, by one or more of:

the instructions comparing the attribute of the window to an attribute previously known to the instructions; and/or the instructions comparing the string resource associated with the window to a string resource previously known to the instructions;

in response to the instructions determining that the window relates to the automatic installation/hardware-first installation mode for the device, the instructions causing the window to close within the graphical user interface, the automatic installation/hardware-first installation mode for the device being exited as a result of the instructions causing the window to close;

the instructions setting a flag;

the instructions completing installation of the software in accordance with the software-first installation mode;

wherein if the flag has been set, the instructions re-initiating the automatic installation/hardware-first installation mode for the device; and, wherein if the flag has not been set, the instructions instructing a user to connect the device to the computer, to cause the operating system to initiate the automatic installation/hardware-first installation mode for the device.

8. The medium of claim 7 wherein re-initiating the automatic installation mode for the device comprises calling a hardware re-enumeration routine of the operating system.

9. A point-of-sale device package comprising:

a device to be connected to a computer via a connector of the device coupling to a corresponding connector of the computer; and, a computer-readable medium storing software for the device and computer instructions executable by a processor of the computer, the computer also running an operating system, wherein the computer instructions perform a method comprising:

the computer instructions installing the software on the computer, in accordance with a software-first installation mode;

in response to the operating system detecting that the device has been connected to the computer, the operating system initiating an automatic installation/hardware-first installation mode for the device; the operating system displaying a window within a graphical user interface, the window related to the automatic installation/hardware-first installation mode and having an attribute and/or a string resource, the computer instructions detecting the window related to the automatic installation/hardware-first installation mode, by one or more of:

the computer instructions comparing the attribute of the window to an attribute previously known to the computer instructions, and/or the computer instructions comparing the string resource associated with the window to a string resource previously known to the computer instructions;

in response to the computer instructions detecting the window, the computer instructions causing the operating system to close the window within the graphical user interface, such that the automatic installation/hardware-first installation mode for the device is suppressed;

the computer instructions setting a flag;

the computer instructions completing installation of the software in accordance with the software-first installation mode;

wherein if the flag has been set, the computer instructions re-initiating the automatic installation/hardware-first installation mode for the device; and, wherein if the flag has not been set, the computer instructions instructing a user to connect the device to the computer, to cause the operating system to initiate the automatic installation/hardware-first installation mode for the device.

10. The package of claim 9, wherein the device is selected from the group essentially consisting of: a printer, a scanner, a multi-function device, and, a digital camera.

11. The package of claim 9, wherein the connector of the device is selected from the group essentially consisting of a Universal Serial Bus (USB) connector, and an IEEE-1394 connector.

* * * * *